United States Patent
Jensen et al.

(10) Patent No.: US 11,913,921 B2
(45) Date of Patent: Feb. 27, 2024

(54) METHODS, MEDIUMS, AND SYSTEMS FOR GENERATING A CHROMATOGRAPHY PROCESSING ACTIVITY MAP

(71) Applicant: WATERS TECHNOLOGIES IRELAND LIMITED, Dublin (IE)

(72) Inventors: Chris Jensen, Coventry, CT (US); Steven M. Cohn, Franklin, MA (US)

(73) Assignee: WATERS TECHNOLOGIES IRELAND LIMITED, Dublin (IE)

( * ) Notice: Subject to any disclaimer, the term of this patent is extended or adjusted under 35 U.S.C. 154(b) by 83 days.

(21) Appl. No.: 17/558,960

(22) Filed: Dec. 22, 2021

(65) Prior Publication Data
US 2022/0196617 A1    Jun. 23, 2022

Related U.S. Application Data

(60) Provisional application No. 63/130,052, filed on Dec. 23, 2020.

(51) Int. Cl.
*G01N 30/72* (2006.01)
*G01N 30/86* (2006.01)
*G01N 30/02* (2006.01)

(52) U.S. Cl.
CPC ..... *G01N 30/8658* (2013.01); *G01N 30/7233* (2013.01); *G01N 2030/027* (2013.01)

(58) Field of Classification Search
CPC .......... G01N 30/8658; G01N 30/7233; G01N 2030/027; G01N 30/8696
See application file for complete search history.

(56) References Cited

U.S. PATENT DOCUMENTS

| | | | | |
|---|---|---|---|---|
| 2008/0133294 | A1* | 6/2008 | Kataria | G06Q 10/087 705/7.11 |
| 2014/0032694 | A1 | 1/2014 | Cohn et al. | |
| 2019/0162707 | A1* | 5/2019 | Strauch | G01N 30/88 |
| 2020/0021444 | A1* | 1/2020 | Young | H04L 9/3239 |

(Continued)

OTHER PUBLICATIONS

International Search Report and Written Opinion for International Patent Application No. PCT/IB2021/062206, dated Mar. 29, 2022.

(Continued)

*Primary Examiner* — David J Bolduc
(74) *Attorney, Agent, or Firm* — Goodwin Procter LLP

(57) ABSTRACT

Exemplary embodiments provide methods, mediums, and systems for creating a processing activity map for an analysis workflow in a chromatography experiment. A result set for the analysis workflow may be created and maintained throughout various stages of the analysis workflow. When certain trigger conditions are met, the in-use version of the result set may be persisted. For example, a read-only historical archive copy of the result set may be created, while the previous version of the result set is used in further stages of the analysis workflow. The trigger conditions may include a number of situations such as moving backwards in the workflow and making a change, moving across gated step boundaries in the analysis workflow, or receiving an instruction to clear the result set. The persistent, historical copies of the result set may be used to support auditing of a compliance-driven analysis process.

22 Claims, 8 Drawing Sheets

(56) References Cited

U.S. PATENT DOCUMENTS

2020/0348273 A1* 11/2020 Michaud ............. G01N 27/622

OTHER PUBLICATIONS

Kauffmann, H-M., et al., "Framework for the quality assurance of 'omics technologies considering GLP requirements", Regulatory Toxicology and Pharmacology, 91:527-535, Oct. 5, 2017.
International Preliminary Report on Patentability for International Patent Application No. PCT/IB2021/062206, dated Jul. 6, 2023.

* cited by examiner

METHODS, MEDIUMS, AND SYSTEMS FOR GENERATING A CHROMATOGRAPHY PROCESSING ACTIVITY MAP

CROSS-REFERENCE TO RELATED APPLICATIONS

This application claims the benefit of U.S. Provisional Patent Application No. 63/130,052, filed Dec. 23, 2020. The entire disclosure of which is hereby incorporated by reference.

BACKGROUND

Chromatography refers to the separation of a mixture by passing it in solution, suspension, or as a vapor through a medium in which the components of the mixture move at different rates. The components may then be analyzed to identify the existence, amount, concentration, or other properties of the components. Chromatography includes a number of different techniques, such as mass spectrometry (MS), liquid chromatography mass spectrometry (LCMS), and many others.

BRIEF SUMMARY

Exemplary embodiments relate to identifying trigger conditions that may occur during a chromatography analysis workflow and using the trigger conditions to flag points at which a result set for a chromatography experiment should be persisted and archived. The record of changes to the workflow and historical results set may be used to create a processing activity map that may be displayed to a user on a user interface.

Exemplary embodiments may take the form of a computer-implemented method, instructions stored on a non-transitory computer-readable medium, a computing apparatus, etc. Unless otherwise noted, it is contemplated that the embodiments described may be used individually in order to achieve the individual advantages noted below or may be applied together in any combination to achieve synergistic results.

According to a first embodiment, a first copy of a result set may be accessed. A result set may be a data structure that includes data for a chromatography experiment and is configured to be processed according to an analysis workflow comprising a plurality of stages. The stages may represent predefined sets of calculations that are performed together; each stage may be organized to perform a set of calculations relating to a common chromatology task, such as identifying peaks in a spectrum generated from a chromatology experiment, identifying components in a mixture, or generating a calibration curve. The analysis workflow may be configured to be performed in a particular order, with a limited set of calculations being performed at the current stage to generate a limited set of data, such as the data needed to process the next stage.

An instruction may be received to engage in an interaction with the analysis workflow. An interaction may be, for example, executing a stage of the analysis workflow, making a change to workflow settings, returning to a previous workflow stage, advancing to a next stage in the workflow, etc. The instruction may be in the form of a user command issued via a user interface, or an automatic command generated by a computing device.

The interaction may be identified as matching a trigger condition. A trigger condition may be a circumstance or set of circumstances that do not comply with data integrity best practices, trigger record-keeping requirements for regulatory compliance purposes, are preconfigured situations in which an administrator has required record-keeping for audit purposes, or any other situations in which it is desirable to record a record of the changes made to the workflow.

In response to the identification, a second copy of the result set may be created. Either the first or the second copy of the result set may be set as a persistent archived copy. A persistent archived copy may be, for example, a historical record that is not intended to be edited; for instance, the persistent archived copy may be a data structure including the information in the result set prior to the trigger condition being reached that is set to a read-only state. The analysis may proceed with the other copy (i.e., the non-persisted non-archived copy) of the result set.

Because the result set is persisted in response to identifying the trigger condition, a complete historical record of the data under analysis may be saved, and the decisions that resulted in the final form of the data can be tracked. This allows auditing and regulatory reports to be performed efficiently and automatically, by consulting the historical versions of the result set. Moreover, a reviewing user can easily determine if changes were made to the workflow for good reasons (e.g., to correct an error) or poor ones (e.g., to apply knowledge gained from a relatively late stage of the analysis to calculations performed at an earlier stage in order to influence the results).

According to a second embodiment, the trigger condition may be one or more of moving backwards or forwards in the workflow across a step boundary between the stages, moving backwards or forwards in the workflow across a gated step boundary between the stages, moving across a step boundary between the stages that an administrator has defined as requiring a version to be generated, moving backwards in the analysis workflow and making a change that would alter results previously generated, or receiving an instruction to clear the result set.

As used above, there may be a step boundary between each of the stages. Some of the step boundaries may be ungated, in that they do not require a user to confirm that they wish to move from one stage to the next. Others may be gated, in that they do require such confirmation, or something more such as credentials or a reason for moving between stages. An administrator may define that any step boundary, whether gated or ungated, may require the creation of a new version of the result set.

The examples described in the second embodiment cover many situations in which the creation of an archived copy of the results set may assist in later auditing or complying with regulatory requirements. Even if not required for auditing or compliance, generating persistent archived copies of the results set at these times are particularly useful in identifying how and when analysis decisions are made. This allows reviewing users to learn from expert analysts and to ensure that analysts are applying best practices (even if not required to do so by law).

According to a third embodiment, the trigger condition may include switching to a manual integration setting, changing a calibration parameter for the chromatography experiment, or changing a method setting. Although these are all acceptable actions to perform in an analysis workflow, they can become problematic in certain contexts. Creating an archived version of the results set before applying these changes allows the changes to be audited in order to ensure that they were properly applied.

According to a fourth embodiment, the persistent archived copy may be the second copy of the result set, and the first copy of the result set may be used when proceeding in the analysis workflow. In other words, when the trigger condition is recognized, the new copy of the result set that is created in response is set to become the backup copy. The original (first) copy of the result set that was already being analyzed in the analysis workflow may continue to be used as the working copy that is altered by the workflow. For example, an instance identifier of the first copy of the result set remains the same while proceeding in the analysis workflow. The instance identifier may be an identifier applied by a data storage structure (such as a database) that identifies the stored data for processes in the workflow. On the other hand, the result set may also be associated with a version number indicating how many times it has been changed. Each time the original result set is copied to make an archived copy, the version number of the original result set may be incremented; the version number in place at the time the original version is copied may be copied as the version number for the archived copy. By maintaining the same instance identifier on the original data, the workflow can proceed more efficiently because the workflow methods do not need to be updated to use the instance identifier of the new copy of the result set. By maintaining a separate version number, the evolution of the result set can be more easily tracked in a visual processing activity map.

According to a fifth embodiment, the result may include a sub-document. Sub-documents may be, for example, documents created by a particular individual stage in the analysis workflow and may include output data generated by that particular stage. Different sub-documents may be generated for each stage, allowing the data from each stage to be segregated. It also allows the user to return to previous stages, make adjustments, and rerun the stages' processing more efficiently. The sub-documents in the result set may be tagged with a version identifier that specifies a version of the result set for which the sub-document was created. Accordingly, changes to the result set can be determined on a more granular level. Even if information about the changes (e.g., a processing activity map generated during the analysis workflow) is lost, the changes can be reconstructed by identifying which sub-documents were created for which version of the result set.

According to a sixth embodiment, the first copy of the result set may include a first sub-document and a subsequent copy of the result set may include a second sub-document. The first sub-document may be compared to the second sub-document to identify a difference between the first copy of the result set and the subsequent copy of the result set. In this way, a system can make inferences about how the result set changed over time and can identify how certain changes to the workflow changed the result set by comparing different historical versions of the sub-documents. For example, in a given result set a sub-document associated with stage A may have been created for version 1 of the result set, and a sub-document associated with a subsequent stage B may have been created for version 2 of the result set. From this information, the system may be able to infer that there was a sub-document for stage B that was created for version 1, and then stage B was subsequently re-run, creating a version 2 of the result set. This change could be flagged and presented to a reviewer, who might attempt to identify what changes were made to the workflow and why. The reviewer might, for instance, retrieve the historical version 1 of the result set to see what the original results for stage B were (by consulting the stage B sub-document for version 1), before the change was made to trigger the result set to become version 2.

According to a seventh embodiment, the analysis workflow may be associated with an embedded method. A method may be an analytical method for analyzing a chromatography experiment; it may include a number of aspects from selection of a chromatography mode to quantification techniques. Embedded methods may be derived from template methods. A template method refers to a method created independently from any given workflow that may be subjected to a method validation process. It may then be associated with a particular workflow and thereby becomes embedded in the workflow's result set. However, after a template method is embedded in a result set, the template method might be changed to a new version; applying the new template method with an earlier result set might therefore yield different results. Accordingly, the embedded method applied to a particular result set may be persisted with the persistent archived copy of the result set, allowing the method that was used to generate the result set to be identified later for auditing, regulatory, or review purposes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
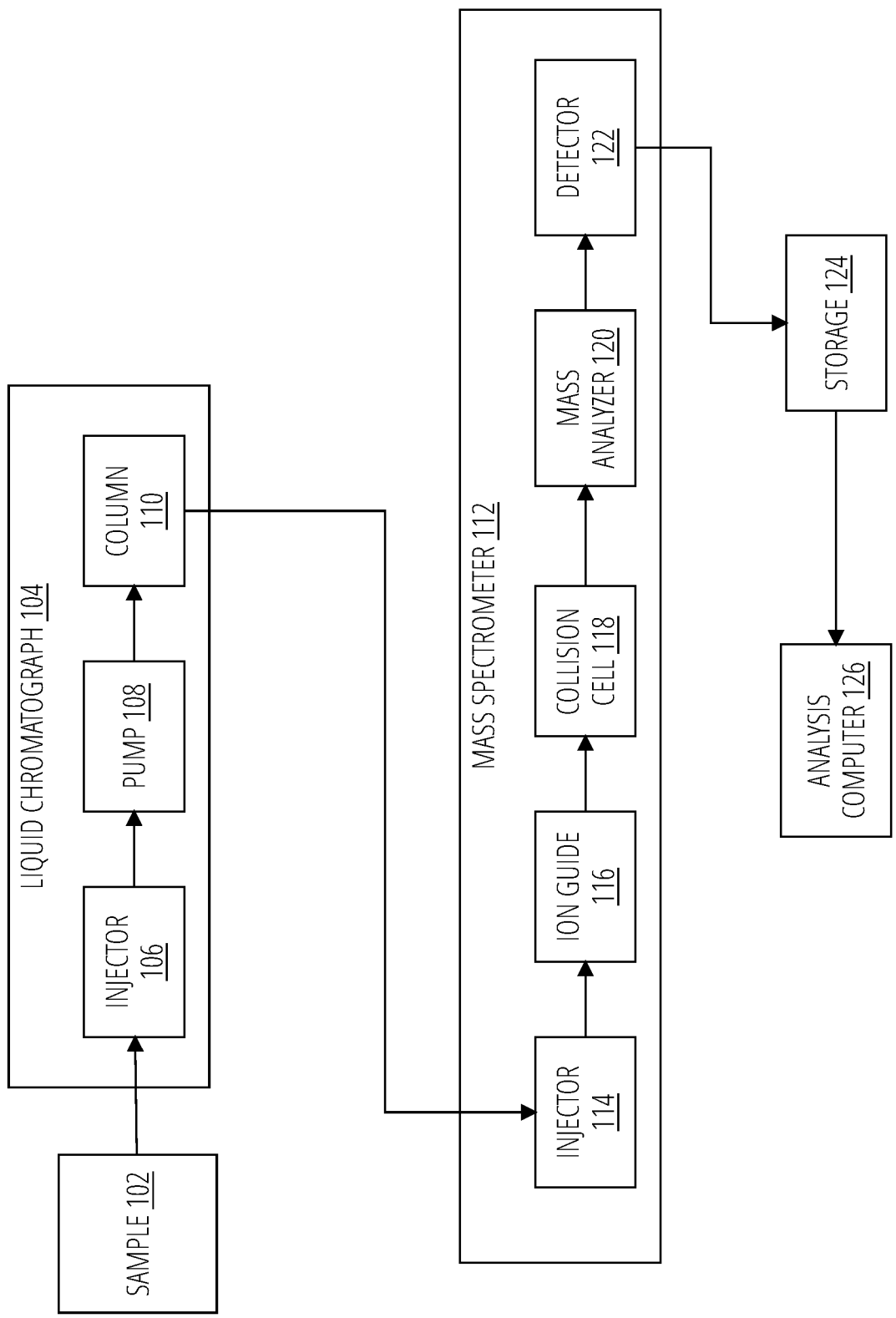
FIG. 1 illustrates an example of a mass spectrometry system according to an exemplary embodiment.

The process of analyzing chromatography results may take place in several steps. An analyst may have some discretion at each step as to how to perform that step (e.g., adjusting certain parameters based on the analysis being performed).

For example, chromatography data might be represented as a chromatogram having peaks at different locations. Each location might correspond to a different component in the mixture being analyzed. The size of the peak may represent the relative abundance of the component. Therefore, in order to determine the component's abundance, the analysis may include detecting the peaks and performing integration on the curve in the vicinity of the peaks. The analyst may have a number of different techniques available for performing peak detection and integration. For instance, the analyst could apply different methods of automatic peak detection, such as detecting a peak at its apex using the second derivative of the chromatogram, or identifying the liftoff point of the peak by comparing the slope of the chromatogram against a fixed threshold. Alternatively or in addition, the analyst could manually identify peaks. Choices exist at every stage of the analysis; for a brief list of some of the available options, please see *Empower* 3: *Data Acquisition and Processing Theory Guide* published by Waters Corporation of Milford, Massachusetts.

The analyst may choose between different options based on their understanding of what is optimal for the current experimental context. Various options may be available at each analysis step, and the analyst's choices can have downstream effects on the end results.

Chromatography is often used in connection with industries that have regulatory or other compliance requirements, such as pharmaceuticals or biotechnology. Analysis workflows may be compliance-driven; for example, the results and decisions made at each stage may need to be preserved for auditing and the analysis should proceed in such a manner that regulators can have confidence that the decisions made at each step were made in order to obtain accurate results (and not to achieve a preordained conclusion). To those ends, compliance guidelines or regulations may provide data integrity requirements (e.g., requiring that data from each analysis step be preserved and protected from being changed) and/or workflow requirements (e.g., requiring that an analysis workflow include certain required steps such as calibrating the experimental apparatus, proceed in a particular order, and prevent a user from using knowledge gained in one processing step to improperly influence the results of the analysis). This is made more complicated by the fact that different countries may have their own compliance regimes.

In order to better comply with regulatory requirements, some chromatography analysis software provides certain types of workflow protections. For example, the analysis may take part in steps that are isolated from each other. At each step, only the information needed to proceed to the next step may be calculated and used to update a result set, effectively providing information to the analyst on a "need to know" basis, so that the analyst cannot target particular desired results.

However, this does not prevent the analyst from running an analysis step, and then using that information to re-run the analysis with the information obtained. By way of example, assume that an analyst selects a peak integration technique based on their knowledge of the experimental context, and generates a first set of results. The first set of results may indicate that a potentially toxic component of a mixture is present in a concentration that exceeds the allowable limits of a government regulator. The analyst should not be able to use this knowledge to return to the peak integration step and select a different integration method that is likely to show a reduced amount of the component.

Nonetheless, there may be legitimate reasons for returning to an earlier step in the analysis (e.g., if a mistake was made at an earlier step, or if an error occurred due to invalid input or other non-deterministic factors, or if the user simply wishes to see what results were generated at an earlier step). Ideally, analysis software should preserve information for compliance purposes, prevent or record problematic changes to the analysis, and give the analyst discretion to apply their own expert knowledge.

Note that returning to a previous processing step in order to make a change that affects downstream results is only one example of a situation that might be problematic. More generally, actions taken during the workflow that do not conform to best practices, or that may run afoul of compliance or regulatory requirements, or that are flagged for preservation for auditing purposes, are referred to below as triggers.

The exemplary embodiments described below address the above-noted issues by computing and preserving a processing activity map. The processing activity map formalizes a guided analysis workflow into a series of steps and updates a result set with the calculations performed at each step. The results set is versioned and preserved. Upon the occurrence of certain triggers, the result set is versioned and preserved. A record of the different versions of the result set may be presented in the form of a map or flow in a GUI to simply and comprehensibly display changes made to the results set throughout the workflow.

By way of example, consider the situation where a user moves backwards across a process step boundary and makes a change that alters downstream results. When the user crosses the step boundary, a flag may be applied to the workflow steps. As long as no changes are made while the flag is applied, the result set remains at its current version. If a change is made at any workflow step while the flag is applied (e.g., switching to manual integration, changing calibration parameters, or changing a method setting), then: (1) the current version of the result set is persisted; (2) the current version is copied to create a new instance with an incremented version number; and (3) the flag is cleared from the new version. This procedure is then repeated for the new version.

These and other features will be described in more detail below with reference to the accompanying figures.

For purposes of illustration, FIG. 1 is a schematic diagram of a system that may be used in connection with techniques herein. Although FIG. 1 depicts particular types of devices in a specific LCMS configuration, one of ordinary skill in the art will understand that different types of chromatographic devices (e.g., MS, tandem MS, etc.) may also be used in connection with the present disclosure.

A sample 102 is injected into a liquid chromatograph 104 through an injector 106. A pump 108 pumps the sample through a column 110 to separate the mixture into component parts according to retention time through the column.

The output from the column is input to a mass spectrometer 112 for analysis. Initially, the sample is desolved and ionized by a desolvation/ionization device 114. Desolvation can be any technique for desolvation, including, for example, a heater, a gas, a heater in combination with a gas or other desolvation technique. Ionization can be by any ionization techniques, including for example, electrospray ionization (ESI), atmospheric pressure chemical ionization (APCI), matrix assisted laser desorption (MALDI) or other ionization technique. Ions resulting from the ionization are fed to a collision cell 118 by a voltage gradient being applied to an ion guide 116. Collision cell 118 can be used to pass the ions (low-energy) or to fragment the ions (high-energy).

Different techniques (including one described in U.S. Pat. No. 6,717,130, to Bateman et al., which is incorporated by reference herein) may be used in which an alternating voltage can be applied across the collision cell 118 to cause fragmentation. Spectra are collected for the precursors at low-energy (no collisions) and fragments at high-energy (results of collisions).

The output of collision cell 118 is input to a mass analyzer 120. Mass analyzer 120 can be any mass analyzer, including quadrupole, time-of-flight (TOF), ion trap, magnetic sector mass analyzers as well as combinations thereof. A detector 122 detects ions emanating from mass analyzer 122. Detector 122 can be integral with mass analyzer 120. For example, in the case of a TOF mass analyzer, detector 122 can be a microchannel plate detector that counts intensity of ions, i.e., counts numbers of ions impinging it.

A storage 124 may provide permanent storage for storing the ion counts for analysis. For example, storage 124 can be an internal or external computer data storage device such as a disk, flash-based storage, and the like. An analysis computer 126 analyzes the stored data. Data can also be analyzed in real time without requiring storage in a storage medium 124. In real time analysis, detector 122 passes data to be analyzed directly to computer 126 without first storing it to permanent storage.

Collision cell 118 performs fragmentation of the precursor ions. Fragmentation can be used to determine the primary sequence of a peptide and subsequently lead to the identity of the originating protein. Collision cell 118 includes a gas such as helium, argon, nitrogen, air, or methane. When a charged precursor interacts with gas atoms, the resulting collisions can fragment the precursor by breaking it up into resulting fragment ions. Such fragmentation can be accomplished as using techniques described in Bateman by switching the voltage in a collision cell between a low voltage state (e.g., low energy, <5 V) which obtains MS spectra of the peptide precursor, with a high voltage state (e.g., high or elevated energy, >15V) which obtains MS spectra of the collisionally induced fragments of the precursors. High and low voltage may be referred to as high and low energy, since a high or low voltage respectively is used to impart kinetic energy to an ion.

Various protocols can be used to determine when and how to switch the voltage for such an MS/MS acquisition. For example, conventional methods trigger the voltage in either a targeted or data dependent mode (data-dependent analysis, DDA). These methods also include a coupled, gas-phase isolation (or pre-selection) of the targeted precursor. The low-energy spectra are obtained and examined by the software in real-time. When a desired mass reaches a specified intensity value in the low-energy spectrum, the voltage in the collision cell is switched to the high-energy state. The high-energy spectra are then obtained for the pre-selected precursor ion. These spectra contain fragments of the precursor peptide seen at low energy. After sufficient high-energy spectra are collected, the data acquisition reverts to low-energy in a continued search for precursor masses of suitable intensities for high-energy collisional analysis.

Different suitable methods may be used with a system as described herein to obtain ion information such as for precursor and product ions in connection with mass spectrometry for an analyzed sample. Although conventional switching techniques can be employed, embodiments may also use techniques described in Bateman which may be characterized as a fragmentation protocol in which the voltage is switched in a simple alternating cycle. This switching is done at a high enough frequency so that multiple high- and multiple low-energy spectra are contained within a single chromatographic peak. Unlike conventional switching protocols, the cycle is independent of the content of the data. Such switching techniques described in Bateman, provide for effectively simultaneous mass analysis of both precursor and product ions. In Bateman, using a high- and low-energy switching protocol may be applied as part of an LC/MS analysis of a single injection of a peptide mixture. In data acquired from the single injection or experimental run, the low-energy spectra contains ions primarily from unfragmented precursors, while the high-energy spectra contain ions primarily from fragmented precursors. For example, a portion of a precursor ion may be fragmented to form product ions, and the precursor and product ions are substantially simultaneously analyzed, either at the same time or, for example, in rapid succession through application of rapidly switching or alternating voltage to a collision cell of an MS module between a low voltage (e.g., generate primarily precursors) and a high or elevated voltage (e.g. generate primarily fragments) to regulate fragmentation. Operation of the MS in accordance with the foregoing techniques of Bateman by rapid succession of alternating between high (or elevated) and low energy may also be referred to herein as the Bateman technique and the high-low protocol.

In summary, such as when operating the system using the Bateman technique, a sample 102 is injected into the LC/MS system. The LC/MS system produces two sets of spectra, a set of low-energy spectra and a set of high-energy spectra. The set of low-energy spectra contain primarily ions associated with precursors. The set of high-energy spectra contain primarily ions associated with fragments. These spectra are stored in a storage 124. After data acquisition, these spectra can be extracted from the storage 124 and displayed and processed by post-acquisition algorithms in the analysis computer 126.

The data acquired by the high-low protocol allows for the accurate determination of the retention times, mass-to-charge ratios, and intensities of all ions collected in both low- and high-energy modes. In general, different ions are seen in the two different modes, and the spectra acquired in each mode may then be further analyzed separately or in combination. The ions from a common precursor as seen in one or both modes will share the same retention times (and thus have substantially the same scan times) and peak shapes. The high-low protocol allows the meaningful comparison of different characteristics of the ions within a single mode and between modes. This comparison can then be used to group ions seen in both low-energy and high-energy spectra.

Figure 7:
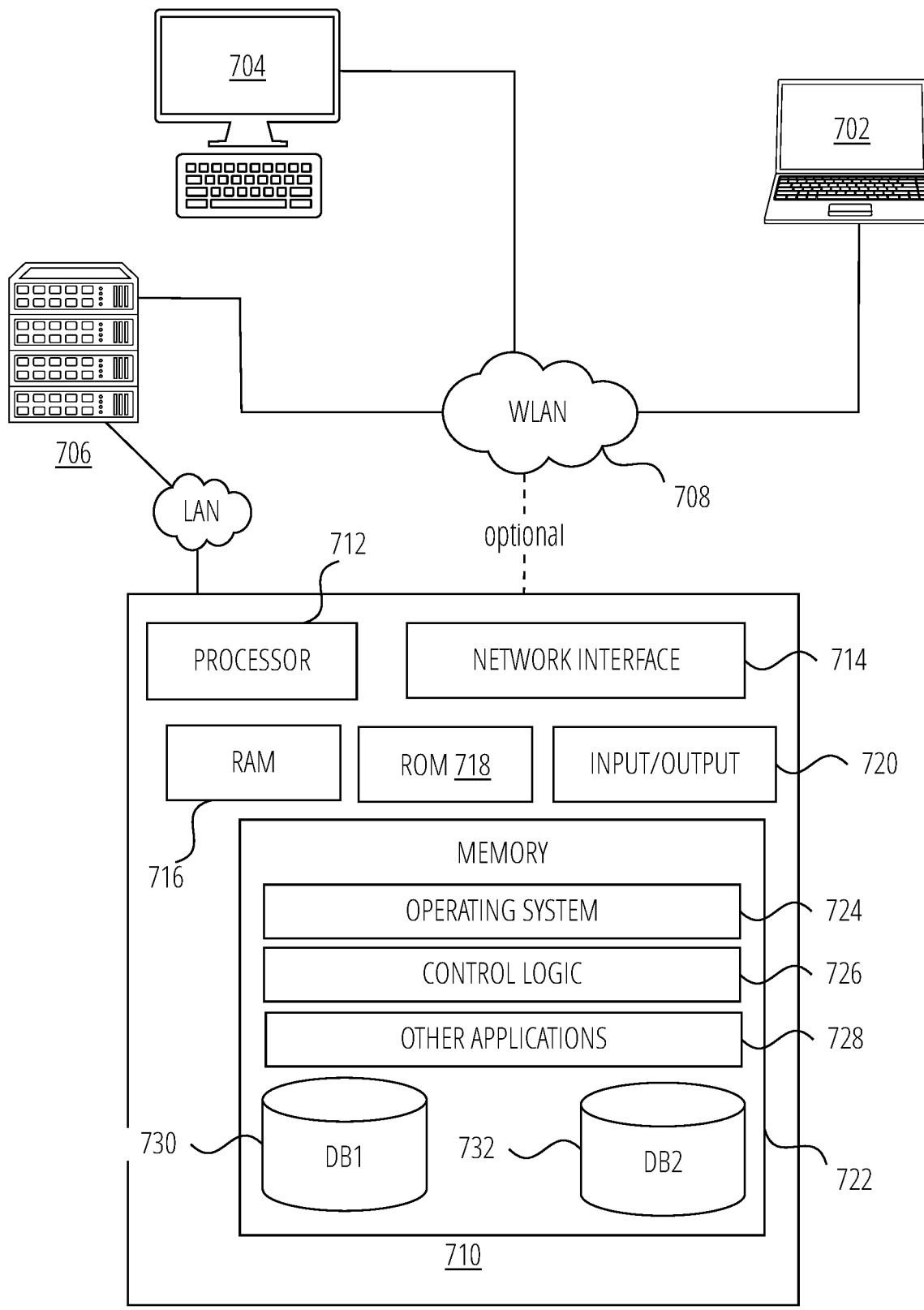
FIG. 7 depicts an illustrative computer system architecture that may be used to practice exemplary embodiments described herein.

The exemplary embodiments described herein may be performed at the analysis computer 126. An example of a device suitable for use as an analysis computer 126 is depicted in FIG. 7.

Figure 2:
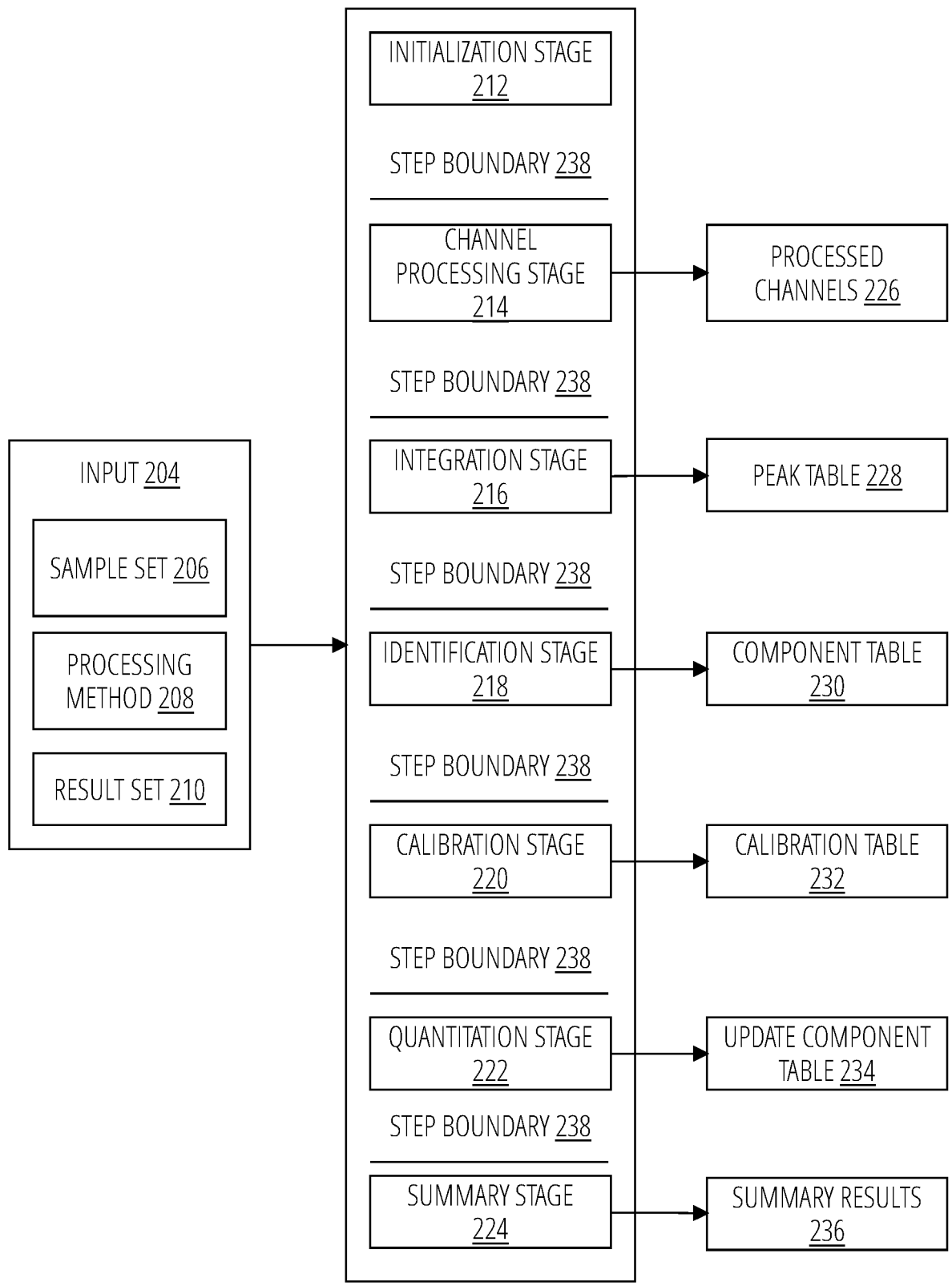
FIG. 2 illustrates an example of a process workflow in accordance with one embodiment.
Figure 3:
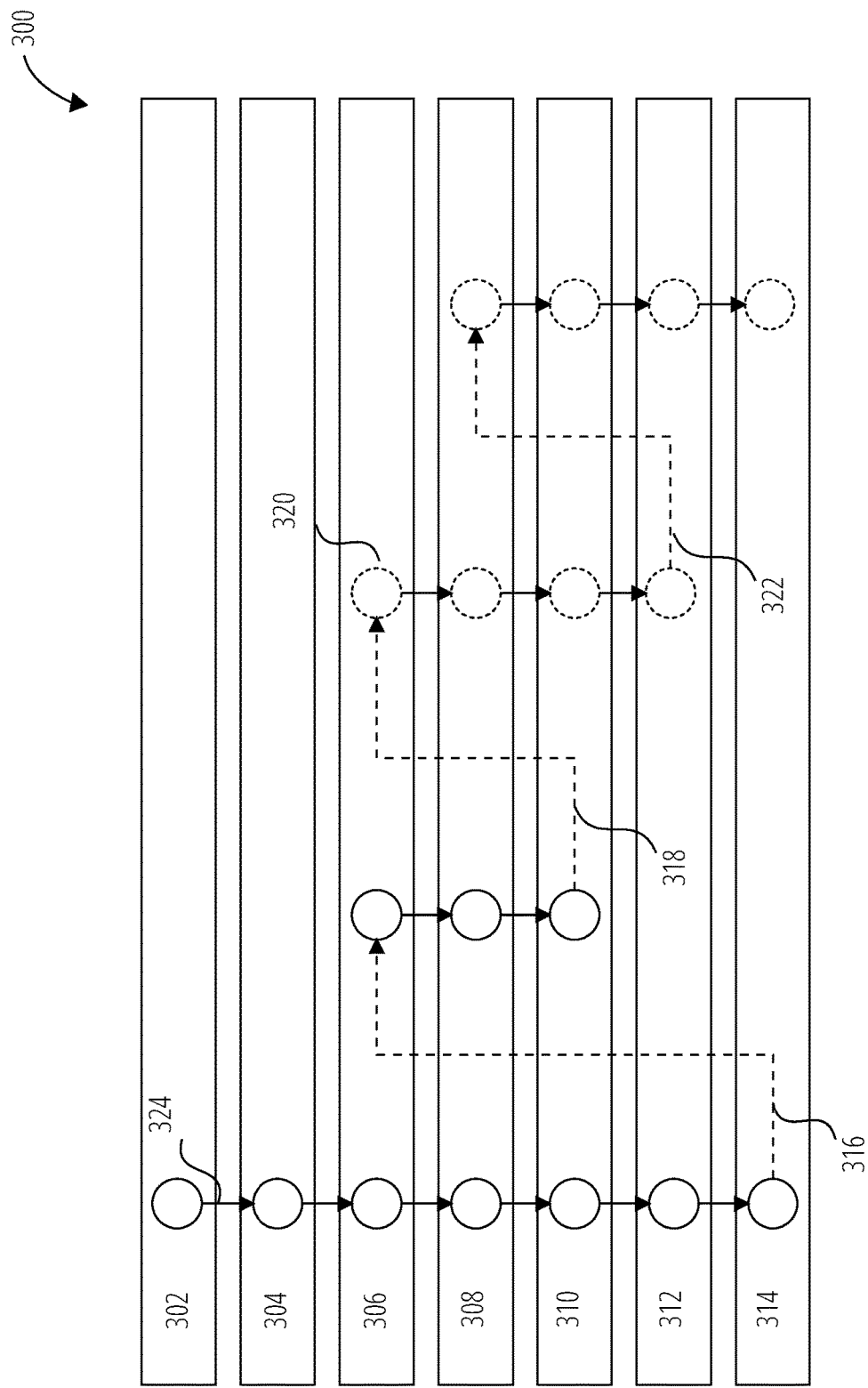
FIG. 3 depicts a simplified example of a result set being updated as a user moves through an exemplary process workflow in accordance with one embodiment.

FIG. 2 depicts an exemplary workflow 202 that may be applied by the analysis computer 126 of FIG. 1. The workflow 202 is designed to take a set of inputs 204, apply a number of workflow steps or stages to the inputs to generate outputs at each stage, and continue to process the outputs at subsequent stages in order to generate results of the experiment. It is noted that the workflow 202 is a specific example of a workflow, and includes particular stages performed in a particular order. However, the present invention is not limited to the specific workflow depicted in FIG. 2. Other suitable workflows may have more, fewer, or different stages performed in different orders; a different example is shown in FIG. 3.

The initial set of inputs 204 may include a sample set 206, which includes the raw (unprocessed) data received from the chromatography experimental apparatus. This may include measurements or readings, such as mass-to-charge ratios. The measurements that are initially present in the sample set 206 may be measurements that have not been processed, for example to perform peak detection or other analysis techniques.

The initial set of inputs 204 may also include a processing method 208, which may be a template method (as discussed above) that is applied to (and hence embedded in) the workflow 202. The processing method 208 may include settings to be applied at various stages of the workflow 202.

The initial set of inputs 204 may also include a result set 210. When created, the result set 210 may include the information from the sample set 206. In some cases, the sample set 206 may be processed in some initial manner when copied into the result set 210—for example, MS data may require extracting, smoothing, etc. before being provided to a workflow 202. The processing applied to the initial result set 210 may be determined on a case-by-case basis based on the workflow 202 being used. Once the raw data is copied from a sample set 206 to create a result set 210, that result set 210 may be entirely independent from the sample set 206 for the remainder of its lifecycle.

The workflow 202 may be divided into a set of stages. Each stage may be associated with one or more stage processors that perform calculations related to that stage. Each stage processor may be associated with stage settings that affect how the processor generates output from a given input.

Stages may be separated from each other by step boundaries 238. The step boundaries 238 may represent points at which outputs have been generated by a stage and stored in the result set, at which point processing may proceed to the next stage. Some stage boundaries may require certain types of input in order to be crossed (for example, the data generated at a given stage might need to be reviewed by one or more reviewers, who need to provide their authorization in order to cross the step boundary 238 to the next stage). Step boundaries 238 may apply any time a user moves from one stage to a different stage, in any direction. For example, a step boundary 238 exists when a user moves from the initialization stage 212 to the channel processing stage 214, but also exists when a user attempts to move backwards from the quantitation stage 222 back to the integration stage 216. Step boundaries 238 may be ungated, meaning that once a user determines to move to the next stage no further input (or only a cursory input) is required, or gated, meaning that the user must provide some sort of confirmation indicating that they wish to proceed to a selected stage (perhaps in response to a warning raised by the analysis computer 126), or a reason for moving to a stage, or credentials authorizing the workflow 202 to proceed to the selected stage.

In an initialization stage 212, each of the stage processors may respond by clearing the results that it generates. For example, the stage processor for the channel processing stage 214 may clear all its derived channels and peak tables (see below). At any point in time, clearing a stage setting may clear stage tracking from the current stage and any subsequent stage. In this example, the initialization stage 212 does not generate any output.

After crossing a step boundary 238, processing may proceed to a channel processing stage 214. As noted above, chromatography detectors may be associated with one or more channels on which data may be collected. At the channel processing stage 214, the analysis computer 126 may derive a set of processing channels present in the data in the result set 210 and may output a list of processed channels 226. The list of processed channels 226 may be stored in a versioned sub-document associated with the channel processing stage 214, which may be included in the result set 210.

After crossing a step boundary 238, processing may proceed to an integration stage 216, which identifies peaks in the data in the result set 210 based on the list of processed channels 226. The integration stage 216 may identify the peaks using techniques specified in the settings for the integration stage 216, which may be defined in the processing method 208. The integration stage 216 may output a peak table 228 and store the peak table 228 in a versioned sub-document associated with the integration stage 216. The sub-document may be included in the result set 210.

After crossing a step boundary 238, processing may proceed to identification stage 218. In this stage, the analysis computer 126 may identify components in the mixture analyzed by the chromatography apparatus based on the information in the peak table 228. The identification stage 218 may output a component table 230, which includes a list of components present in the mixture. The component table 230 may be stored in a versioned sub-document associated with the identification stage 218. The sub-document may be included in the result set 210.

After crossing a step boundary 238, processing may proceed to calibration stage 220. During a chromatography experiment, calibration compounds may be injected into the chromatography apparatus. This process allows an analyst to account for subtle changes in electronics, cleanliness of surfaces, ambient conditions in the lab, etc. throughout an experiment. In the calibration stage 220, data obtained with respect to these calibration compounds is analyzed and used to generate a calibration table 232, which allows the analysis computer 126 to make corrections to the data to ensure that it is reliable and reproducible. The calibration table 232 may be stored in a versioned sub-document associated with the calibration stage 220. The sub-document may be included in the result set 210.

After crossing a step boundary 238, processing may proceed to quantitation stage 222. Quantitation refers to the process of determining a numerical value for the quantity of an analyte in a sample. The analysis computer 126 may use the results from the previous stages in order to quantify the components included in the component table 230. The quantitation stage 222 may update 234 the component table 230 stored in the result set 210 with the results of quantitation. The updated component table 230 may be stored in a versioned sub-document associated with the quantitation stage 222. The sub-document may be included in the result set 210.

After crossing a step boundary 238, processing may proceed to summary stage 224. In the summary stage 224, the results of each of the previous stages may be analyzed and incorporated into a report of summary results 236. The summary results 236 may be stored in a versioned sub-document associated with the summary stage 224. The sub-document maybe included in the result set 210.

The above description provides a straightforward example of how an analysis process might take place given the depicted workflow 202. However, in practice an analyst may not proceed through a workflow in such a straightforward manner. When the analyst makes changes to the workflow settings or parameters during the analysis, it may trigger versioning of the result set 210. In order to understand how the result set 210 was versioned over time, a processing activity map may be generated, as shown in the example in FIG. 3.

FIG. 3 depicts an exemplary processing activity map 300 that may be generated to show how and when changes were made to a workflow's settings. This example is set up to detect a particular trigger condition (namely, when a user moves backwards in the workflow and changes a workflow setting).

The workflow represented in the processing activity map 300 includes seven stages: check acquisition stage 302, check inputs stage 304, integrate peaks stage 306, identify components stage 308, calibration stage 310, system suitability stage 312, and results stage 314. A description of the specific processing performed by each stage is not necessary to understand the processing activity map 300 and is therefore omitted for the sake of brevity.

In the processing activity map 300, each circular node corresponds to a result set which, as noted above, is updated with the output from each stage. A change in the version number of the result set is indicated by a change in the outline of the node (e.g., from solid to dashed lines). In this example, two result sets are generated; the processing activity map 300 allows reviewers to understand what changes were made to the workflow settings throughout the analysis, and to determine whether the changes were appropriate.

Each time the user advances to the next stage in the workflow, this is marked in the processing activity map 300 by a step boundary transition 324. In this example, the user first proceeded all the way through the analysis, from the check acquisition stage 302 to the results stage 314 (as indicated by the nodes connected by step boundary transitions 324 on the left side of the processing activity map 300).

After the user finished the analysis and obtained results, the user moved backwards in the workflow to integrate peaks stage 306. This is part of the trigger condition, but the trigger condition is a multi-part requirement (the user must move backwards in the workflow and change a workflow setting). The backwards movement is indicated in the processing activity map by a step boundary reversal 316, which is similar to the step boundary transition 324 but is visually distinguished (in this case, by using a dashed line) because it represents one part of the requirement for the trigger condition. The result set may also now be associated with a reversal flag indicating that part of the trigger condition has been met.

In this example, the user then proceeds from the integrate peaks stage 306 to the calibration stage 310 without making changes to the workflow settings. Thus, the second part of the trigger has not yet been met. Afterwards, the user performs another step boundary reversal 318, returning to the integrate peaks stage 306 again. At this point, however, the user makes a change 320 to the workflow settings (e.g., switching to manual peak integration). This triggers the second part of the trigger. In response to detecting the second part of the trigger, the analysis computer 126 checks to see if the reversal flag is set (it is). Upon detecting the presence of the reversal flag and a change to the workflow settings, the analysis computer 126 determines that the trigger conditions have been met and versions the result set. In order to identify that the result set has been changed to a new version, the outline of the node is changed to a dashed line, which persists until the result set is updated to yet a further version (not pictured) due to the trigger condition being met again.

When the result set is updated to a new version, the reverse flag is cleared. Proceeding through the example, the user next continues through the workflow to the system suitability stage 312, where the user performs another step boundary reversal 322 to identify components stage 308. The reverse flag is accordingly set again. However, the user then proceeds from the identify components stage 308 to the results stage 314 without making any further changes, so the node associated with the result set is not further updated to indicate another version.

The processing activity map 300 may be stored on a non-transitory computer-readable storage medium and called up for display on a user interface. The processing activity map 300 may be interactable. For example, hovering over or clicking on a given node may show details about the result set indicated by the node, such as the node version number. If a user hovers or clicks on a node indicating a new version, then the changes to workflow settings that resulted in the new version may be shown. The user who made the change may be identified, as well as any comments or reasons given for the change. The sub-document associated with the output of the stage whose settings were changed may be selectable, with any differences between the changed sub-document and any previous versions of the sub-document highlighted.

In some embodiments, the processing activity map may be built as a user proceeds through the workflow, being updated in parallel with the workflow as the user transitions between stages, meets trigger conditions, and causes the result set to be updated. For instance, the current version of the processing activity map may be stored in the result set, or elsewhere accessible to the workflow processors. In other embodiments, the processing activity map 300 may be generated on-the-fly based on the version numbers of the result sets associated with the experiments and/or the version numbers of the sub-documents in the results sets.

Note that solid, dashed, and dotted lines are used in this example purely for illustrative purposes. Differences in the versions of the result set and actions matching trigger conditions may be indicated in any suitable manner for visually distinguishing the differences, such as by using different colors, different shapes, different styles, etc.

Figure 4A:
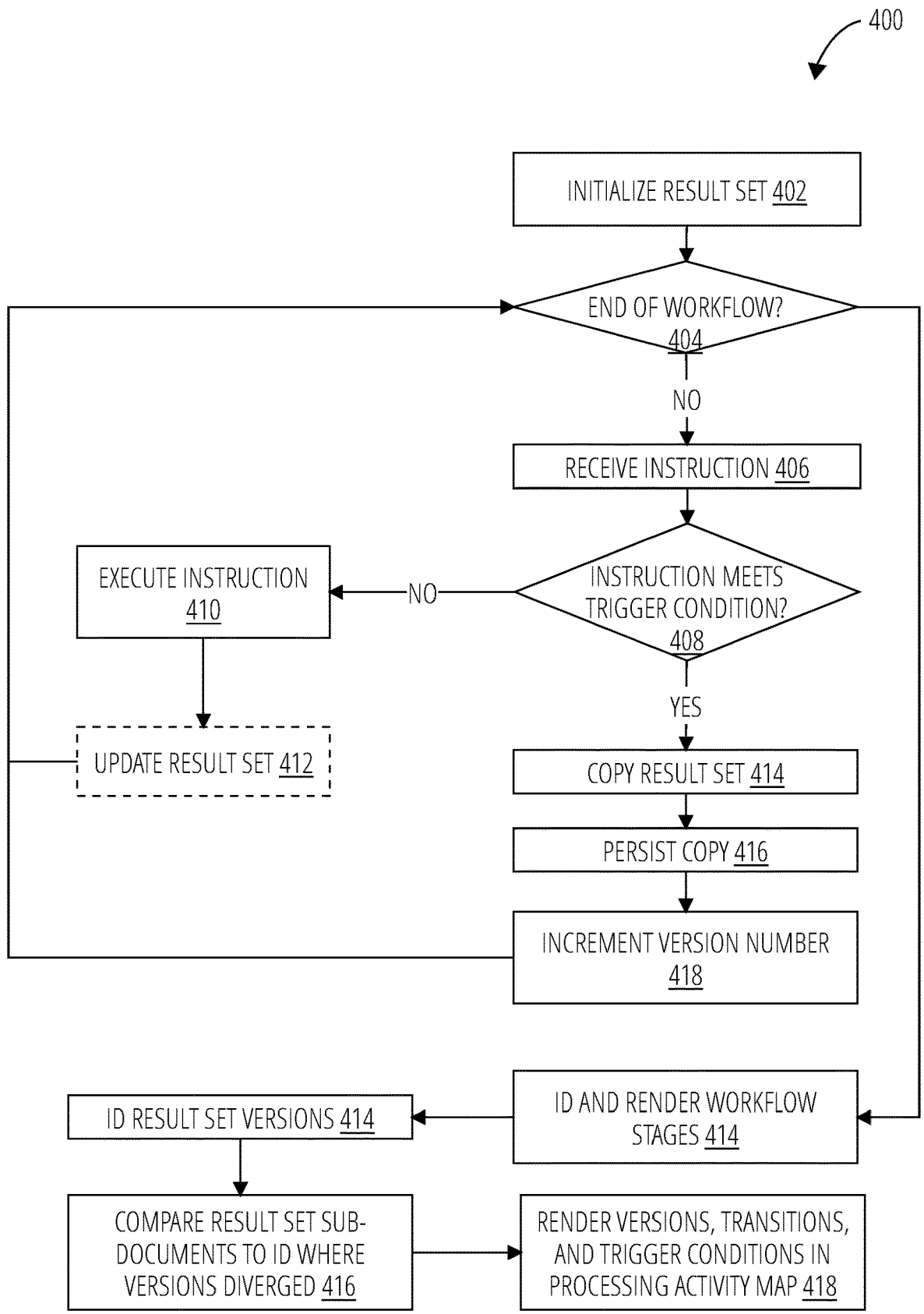
FIG. 4A is a flowchart depicting exemplary general logic suitable for use with an exemplary embodiment.

FIG. 4A depicts exemplary process mapping logic 400 for versioning a result set and generating a processing activity map, according to an exemplary embodiment. The process mapping logic 400 may be embodied as a computer-implemented method or as instructions stored on a non-transitory computer-readable storage medium and may be configured to cause a processor to perform the logical blocks included in FIG. 4A. In some embodiments, the process mapping logic 400 may be performed by a computing system configured to perform the logical blocks included in FIG. 4A.

At block 402, the system may initialize a result set. Initializing the result set may include generating an empty result set and/or copying data from a chromatography experiment into a result set. The data may be initial data that is unprocessed, or that is processed in order to place it into an initial condition required by a guided analysis workflow. The result set may be initialized to a starting version number (e.g., 0 or 1) and a starting instance identifier, which identifies the result set in a database or other data structure. The instance identifier may be automatically generated by the database or other data structure.

At decision block 404, the system may determine if the end of the workflow has been reached (for example, the user indicates that the result set is final and no further analysis is required. If not, processing proceeds to block 406. If so, processing proceeds to block 414.

At block 406 (more processing is required in decision block 404), the system receives an instruction from a user. The instruction may be, for example, an instruction to execute the next workflow step, an instruction to change a setting associated with the workflow (e.g. a workflow method setting), or an instruction to move to a new stage in the workflow (which may include moving forwards or backwards in the workflow by a specified number of stages), among other possibilities.

At decision block 408, the system may determine whether the instruction received at block 406 meets a trigger condition. The trigger conditions may be user- or administrator-defined, and/or may be predefined. The trigger condition may specify a single circumstance that triggers the trigger condition, or a combination of circumstances.

Examples of trigger conditions include, but are not limited to, moving backwards or forwards in the workflow across a step boundary between the stages, moving backwards or forwards in the workflow across a gated step boundary between the stages, moving across a step boundary between the stages that an administrator has defined as requiring a version to be generated, moving backwards in the analysis workflow and making a change that would alter results previously generated, and receiving an instruction to clear the result set. Further examples, which may be applied separately or in combination with the above examples, include switching to a manual integration setting, changing a calibration parameter for the chromatography experiment, or changing a method setting.

If it is determined at decision block 408 that the instruction did not meet the trigger condition, then at block 410 the system may execute the instruction. If executing the instruction causes a stage processor to generate an output, then at block 412 the system may optionally update the result set with the output. This may include adding a new sub-document (tagged with the current result set's version number) to the result set. Processing may then return to decision block 404.

If the instruction did meet the trigger condition at decision block 408, then at block 414 the system may copy the result set. The new copy may include a different instance identifier (with the original instance identifier remaining with the original, copied result set). The new copy may be persisted at block 414, for example by marking it as a read-only copy and/or storing it in an archive. At block 414, the version number of the original copied result set may be incremented. The copy created at block 414 may bear the version number of the original copied result set. Both the original result set and the copy may include a fixed identifier, which may remain the same across different copies of the result set (allowing them to be recognized as belonging to the same experiment/workflow). Processing may then return to decision block 404.

If, at decision block 404, it is ever determined that the workflow is complete, processing may proceed to block 414 and the system may generate the processing activity map. At block 414, the system identifies and renders the stages of the workflow. For example, the workflow may be represented as a data structure or set of data structures that identify each stage and the processor(s) associated with each stage. The system may read the data structures to determine the stages involved in the workflow and render them in the processing activity map (e.g., as different blocks as shown in FIG. 3).

At block 414, the system may identify and retrieve the different result set versions that were generated in blocks 402-418. The system may consult the fixed identifier and version identifier to determine what result set versions were generated, and in what order.

At block 416, the system may examine the sub-documents associated with each result set, and particularly the version number associated with each sub-document, to identify where the result set diverged from the preceding and/or succeeding result sets. Alternatively or in addition, each time an instruction is executed in block 410 that moves the workflow to a different stage, then the system may log the starting and ending stage (e.g., in the result set and/or in a processing activity log); similarly, when the instruction at block 410 is an instruction to update a setting or a determination is made at block 408 that the instruction meets a trigger condition, this may also be logged in the result set or the processing activity log. This information may be used to determine how the user moved through the workflow and when trigger conditions were met or changes were made, so that these activities can be reflected in the processing activity map 300.

At block 418, the system may use the information obtained at blocks 414-424 to render or update the processing activity map. The processing activity map may be presented to a user on a user interface of a display device and/or stored in a non-transitory computer-readable medium.

This particular example assumes that the processing activity map is generated after the workflow is complete. However, in some embodiments, the processing activity map may be displayed and updated as the user moves through the workflow. In these embodiments, blocks 420-424 may be performed in parallel with blocks 406-418.

Figure 4B:
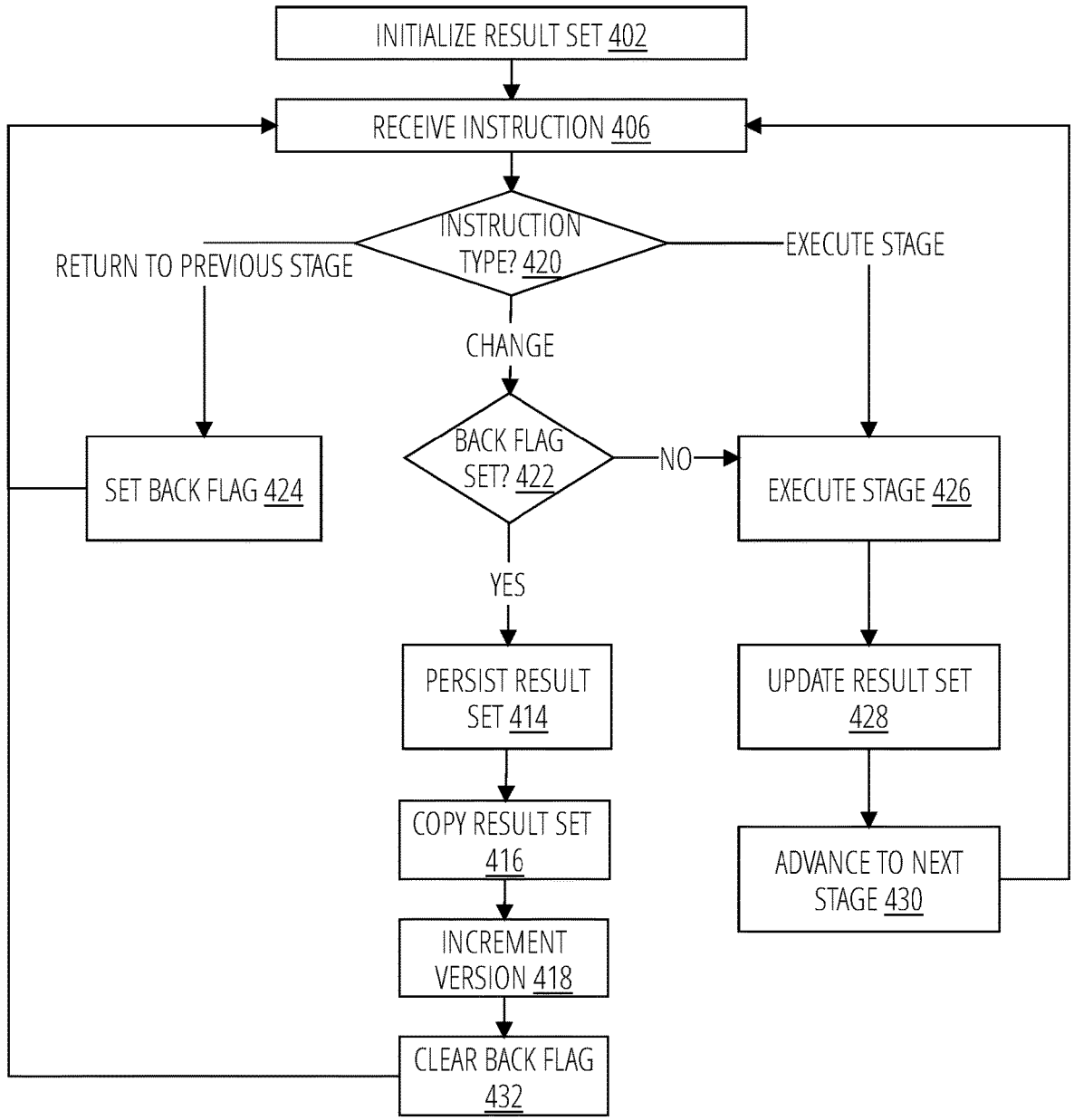
FIG. 4B is a flowchart depicting an example of the logic of FIG. 4A applied to a particular type of trigger in accordance with one embodiment.

FIG. 4A refers to a trigger condition, assuming that the trigger condition can be met with one instruction in block 406. However, in some cases a trigger condition may require two or more activities to be performed, sometimes in a particular order. FIG. 4B depicts exemplary logic for versioning a result set based on an example of a multi-part triggering condition, according to one exemplary embodiment. In particular, the trigger condition in this embodiment is triggered when the user moves backwards in the workflow and subsequently makes a change to a method or workflow setting. In this case, the order of the triggering conditions matters: it is acceptable for a user to change a method or workflow setting before they see the results of subsequent stages, but not after.

Blocks 402-406 may be performed as in FIG. 4A, except that the result set may be initialized with a back flag that can take a value of 0 or 1. The result set may initially have the back flag set to 0.

After the instruction is received at block 406, the system may determine what type of instruction was received. In this example, the (simplified) set of instruction types may include an instruction to change a method or workflow setting, an instruction to return to a previous stage, or an instruction to execute the current stage.

If the instruction is an instruction to execute the current stage, then processing may proceed as defined by the stage's data structure in the workflow. At block 426, the stage may be executed according to the instructions for the stage's processor, generating output. At block 428, the result set may be updated with the output, and at block 430 the system may optionally advance the workflow to the next stage.

In some cases, the workflow will not be automatically advanced—for example, the result set may require review and sign off before moving to the next stage, so the system may place the result set in a review state, as discussed below in connection with FIG. 5. After the review is complete and the result set is changed to an approved state, block 430 may cause the workflow to be advanced to the next stage.

Processing may then return to block 406 where the system awaits a further instruction.

If the instruction is an instruction to return to a previous stage, then the first part of the triggering condition is met. At block 424, the system sets the back flag to 1 and moves to the requested stage. Processing then returns to block 406 where the system awaits a further instruction.

If the instruction is an instruction to change one or more workflow or method settings, then processing may proceed to decision block 422 where the system determines if the back flag is already set t0 "1." If not (the back flag is set to "0"), processing may proceed to block 426 and the current stage may be executed using the changed settings. If so (the back flag is set to "1"), then the trigger condition has been met. The system may create a new version of the result set as previously described, and then at block 432 the back flag may be cleared from the current version that is being processed in the workflow. Processing may then return to block 406 where the system awaits a further instruction.

Figure 5:
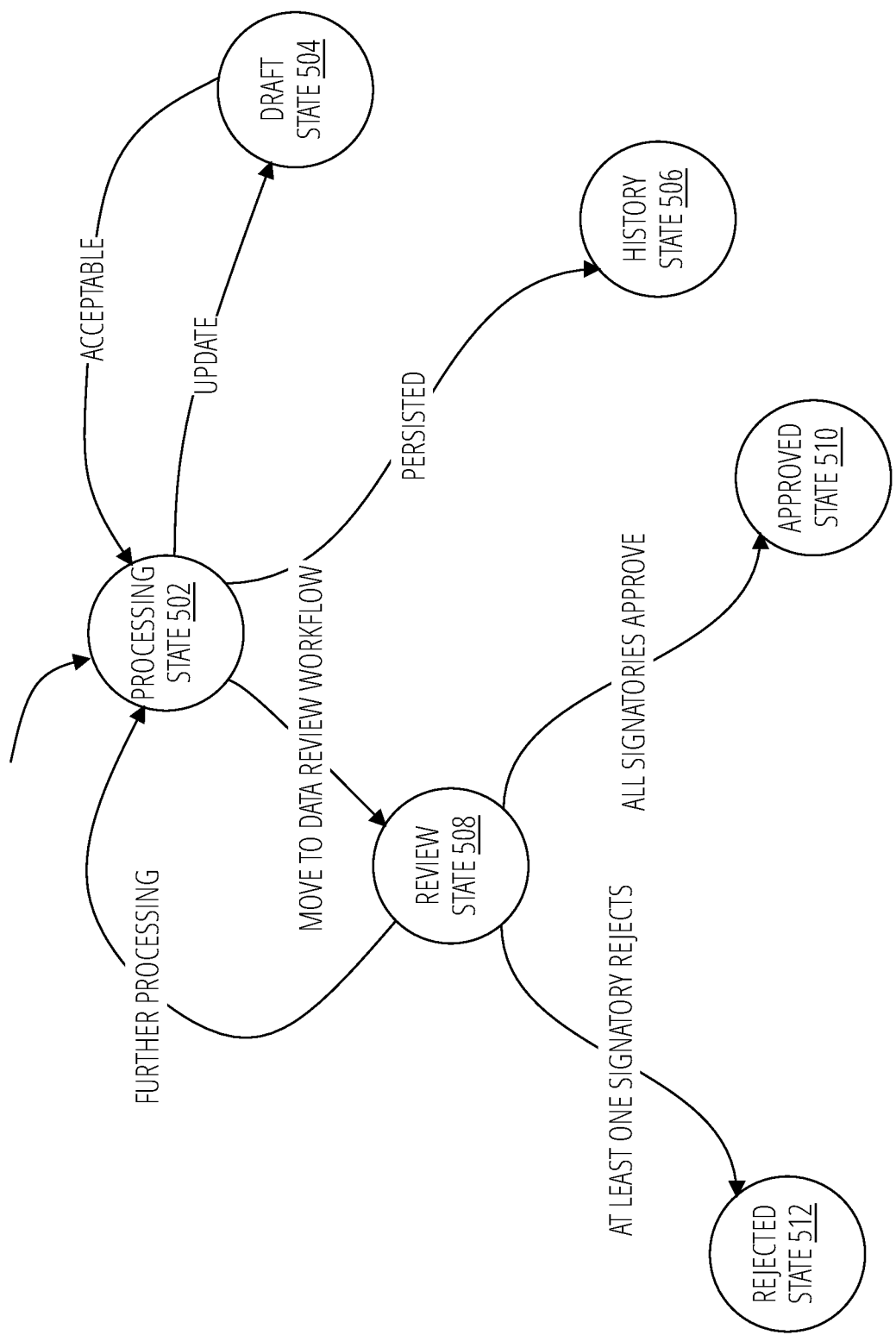
FIG. 5 is a state diagram depicting the possible states of the result set in accordance with one embodiment.

FIG. 5 is a state diagram depicting the different states that a result set or sub-document may be in, according to an exemplary embodiment. The state of the document determines what actions can be performed on it.

A document is initially created in the processing state 502. The processing state is the initial state indicating that the document is available for processing and alterations by a user. The result set generally stays in the processing state unless a trigger condition is met or the user ends the workflow.

If the trigger condition is met, a new copy of the result set is created and placed in the history state 506. The history state 506 is a read-only state indicating a historical record of a previous version of the result set. Once a historical version is created, it cannot be modified, reprocessed, or individually deleted.

Meanwhile, the previous result set may have its version number incremented and may be placed into a draft state 504. The updated result set may be checked for any problems, and then returned to the processing state 502. If a problem arises and the new version is not acceptable, then the draft version can be discarded and the system may roll the result set back to the previous Processing version.

When the user is satisfied with the result set but requires authorization to move to a new stage or finalize the result set, the result set may be moved to a review state 508. The review state 508 is a read-only state in which the result set cannot be modified or reprocessed. Users may review the data and audit history.

From the review state, the required signatories can accept the data by signing it; if the required users sign the data, the result set transitions to the approved state 510. The approved state 510 is a read-only end state, in which the data cannot be processed further. If the data is rejected by a required signatory, then the result set can be transitioned to a rejected state 512. This is also a read-only end state in which the data cannot be processed further. In some cases the reviewers may neither accept or reject the result set, but may instead indicate that further processing is required. In this case, the result set moves back to the processing state 502.

Figure 6:
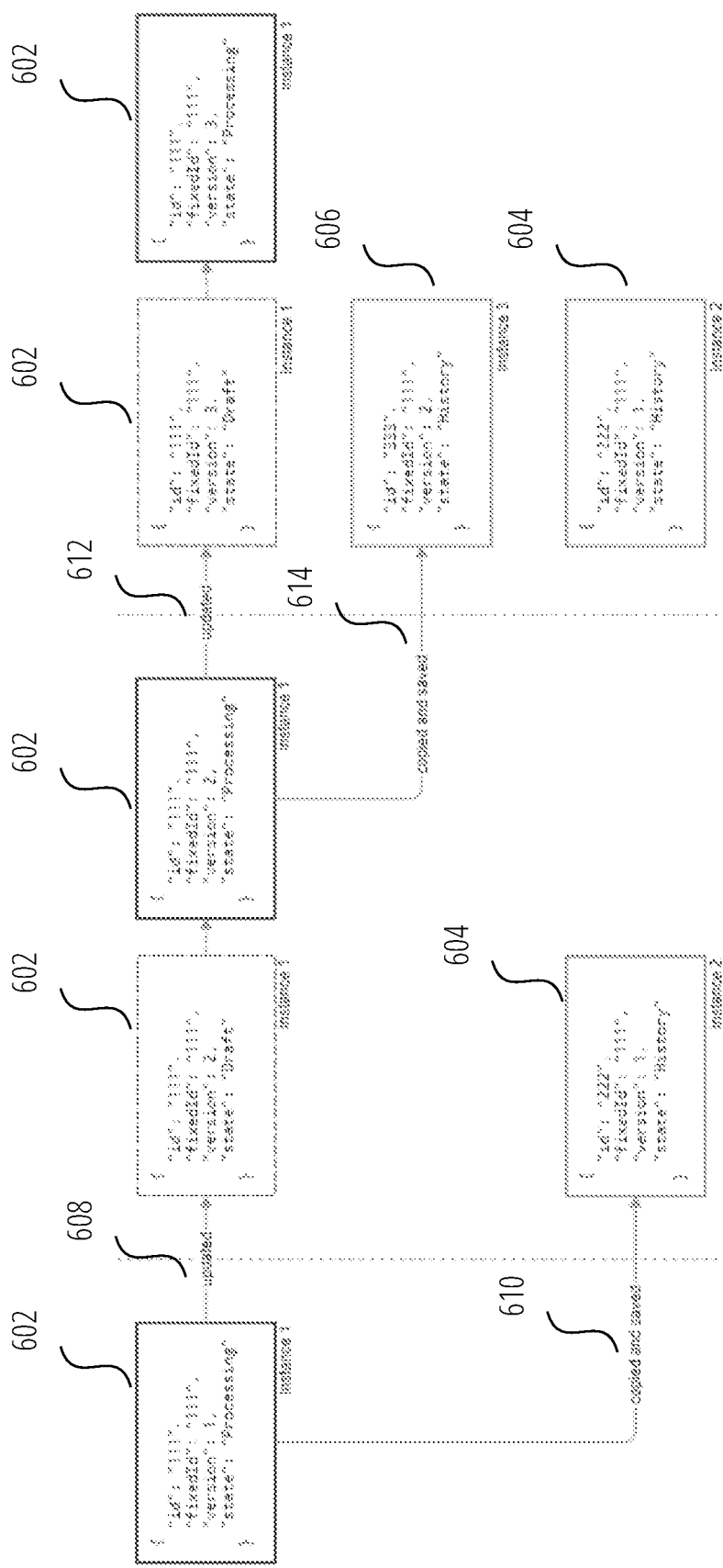
FIG. 6 is a data flow diagram showing how a result set is changed over time in accordance with one embodiment.

FIG. 6 is a data flow diagram depicting an example of how a result set is versioned and changed in state throughout a workflow, according to an exemplary embodiment. The details of the underlying data for each result set are omitted for brevity, but each result set does show its instance identifier (depicted as the "id" field), fixed identifier ("fixedID"), version number ("version") and state ("state"). Each of those terms is defined above.

A first instance 602 of a result set is initially created. Note that the first instance 602 is updated and used as the processing version throughout the workflow. The first instance 602 is created with an instance identifier of "111," which is also used as the fixed identifier. The fixed identifier stays the same in all current and historical versions throughout the workflow. The first instance 602 is also created with a version number of "1" and is created in the processing state.

At some point in the workflow, the trigger condition is met and a version update 608 is triggered. Consequently, a new copy is created and archived 610 as a second instance 604. The second instance 604 bears the same fixed identifier and version number as the version of the first instance 602 from which it was copied, but its instance identifier is updated to "222" and its state is set to "history."

The version number of the first instance 602 is then updated to "2" and the updated first instance 602 is set to the "draft" state. When the updated version is validated, the state is updated to "processing" and worked upon by the workflow. Subsequently, a triggering condition is detected and another version update 612 occurs. This causes another new copy of the first instance 602 to be created and archived 614. The copied version bears the version number of the version of the first instance 602 from which it was created ("2") and has its instance identifier updated to "333" and its state set to "historical." The second instance 604 continues to exist as a historical document.

The first instance 602 then has its version number updated and is placed into the draft state. When it is validated, it is again placed into the processing state and this process continues until the first instance 602 is placed into an end state such as "accepted" or "rejected."

FIG. 7 illustrates one example of a system architecture and data processing device that may be used to implement one or more illustrative aspects described herein in a stand-alone and/or networked environment. Various network nodes, such as the data server 710, web server 706, computer 704, and laptop 702 may be interconnected via a wide area network 708 (WAN), such as the internet. Other networks may also or alternatively be used, including private intranets, corporate networks, LANs, metropolitan area networks (MANs) wireless networks, personal networks (PANs), and the like. Network 708 is for illustration purposes and may be replaced with fewer or additional computer networks. A local area network (LAN) may have one or more of any known LAN topology and may use one or more of a variety of different protocols, such as ethernet. Devices data server 710, web server 706, computer 704, laptop 702 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 710, web server 706, and client computer 704, laptop 702. Data server 710 provides overall access, control and administration of databases and control software for performing one or more illustrative aspects described herein. Data serverdata server 710 may be connected to web server 706 through which users interact with and obtain data as requested. Alternatively, data server 710 may act as a web server itself and be directly connected to the internet. Data server 710 may be connected to web server 706 through the network 708 (e.g., the internet), via direct or indirect connection, or via some other network. Users may interact with the data server 710 using remote computer 704, laptop 702, e.g., using a web browser to connect to the data server 710 via one or more externally exposed web sites hosted by web server 706. Client computer 704, laptop 702 may be used in concert with data server 710 to access data stored therein, or may be used for other purposes. For example, from client computer 704, a user may access web server 706 using an internet browser, as is known in the art, or by executing a software application that communicates with web server 706 and/or data server 710 over a computer network (such as the internet).

Servers and applications may be combined on the same physical machines, and retain separate virtual or logical addresses, or may reside on separate physical machines. FIG. 7 illustrates just one example of a network architecture that may be used, and those of skill in the art will appreciate that the specific network architecture and data processing devices used may vary, and are secondary to the functionality that they provide, as further described herein. For example, services provided by web server 706 and data server 710 may be combined on a single server.

Each component data server 710, web server 706, computer 704, laptop 702 may be any type of known computer, server, or data processing device. Data server 710, e.g., may include a processor 712 controlling overall operation of the data server 710. Data server 710 may further include RAM 716, ROM 718, network interface 714, input/output interfaces 720 (e.g., keyboard, mouse, display, printer, etc.), and memory 722. Input/output interfaces 720 may include a variety of interface units and drives for reading, writing, displaying, and/or printing data or files. Memory 722 may further store operating system software 724 for controlling overall operation of the data server 710, control logic 726 for instructing data server 710 to perform aspects described herein, and other application software 728 providing secondary, support, and/or other functionality which may or may not be used in conjunction with aspects described herein. The control logic may also be referred to herein as the data server software control logic 726. Functionality of the data server software may refer to operations or decisions made automatically based on rules coded into the control logic, made manually by a user providing input into the system, and/or a combination of automatic processing based on user input (e.g., queries, data updates, etc.).

Memory 1122 may also store data used in performance of one or more aspects described herein, including a first database 732 and a second database 730. In some embodiments, the first database may include the second database (e.g., as a separate table, report, etc.). That is, the information can be stored in a single database, or separated into different logical, virtual, or physical databases, depending on system design. Web server 706, computer 704, laptop 702 may have similar or different architecture as described with respect to data server 710. Those of skill in the art will appreciate that the functionality of data server 710 (or web server 706, computer 704, laptop 702) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:
   accessing a first copy of a result set comprising data for a chromatography experiment and configured to be processed according to an analysis workflow comprising a plurality of stages;
   receiving an instruction to engage in an interaction with the analysis workflow;
   identifying that the interaction matches a trigger condition;
   making a second copy of the result set in response to the interaction matching the trigger condition;
   making one of the first copy or the second copy of the result set a persistent archived copy; and
   proceeding in the analysis workflow with the other of the first copy or the second copy of the result set.

2. The method of claim 1, wherein the trigger condition comprises one or more of:
   moving backwards or forwards in the workflow across a step boundary between the stages;
   moving backwards or forwards in the workflow across a gated step boundary between the stages;
   moving across a step boundary between the stages that an administrator has defined as requiring a version to be generated;
   moving backwards in the analysis workflow and making a change that would alter results previously generated; or
   receiving an instruction to clear the result set.

3. The method of claim 1, wherein the trigger comprises switching to a manual integration setting, changing a calibration parameter for the chromatography experiment, or changing a method setting.

4. The method of claim 1, wherein the persistent archived copy is the second copy of the result set, the first copy of the result set is used when proceeding in the analysis workflow, and an instance identifier of the first copy of the result set remains the same while proceeding in the analysis workflow.

5. The method of claim 1, wherein the result set comprises a sub-document, and the sub-document is tagged with a version identifier for a version of the result set for which the sub-document was created.

6. The method of claim 5, wherein the first copy of the result set includes a first sub-document and a subsequent copy of the result set includes a second sub-document, and further comprising comparing the first sub-document to the second sub-document to identify a difference between the first copy of the result set and the subsequent copy of the result set.

7. The method of claim 1, wherein the analysis workflow is associated with an embedded method, and further comprising persisting the embedded method with the persistent archived copy of the result set.

8. A method comprising:
accessing a result set comprising data for a chromatography experiment and configured to be processed according to an analysis workflow comprising a plurality of stages;
receiving an instruction to engage in an interaction with the analysis workflow;
processing the result set according to the analysis workflow, the processing comprising:
(a) identifying whether the interaction during a stage matches a trigger condition;
(b) providing a persistent indication if the interaction matches a trigger condition;
repeating steps (a) and (b) for the plurality of stages.

9. The method of claim 8, further comprising:
making a second copy of the result set in response to the interaction matching the trigger condition;
making one of the first copy or the second copy of the result set a persistent archived copy; and
proceeding in the analysis workflow with the other of the first copy or the second copy of the result set.

10. The method of claim 8, wherein the trigger condition comprises one or more of:
moving backwards or forwards in the workflow across a step boundary between the stages;
moving backwards or forwards in the workflow across a gated step boundary between the stages;
moving across a step boundary between the stages that an administrator has defined as requiring a version to be generated;
moving backwards in the analysis workflow and making a change that would alter results previously generated; or
receiving an instruction to clear the result set.

11. The method of claim 9, wherein the persistent archived copy is the second copy of the result set, the first copy of the result set is used when proceeding in the analysis workflow, and an instance identifier of the first copy of the result set remains the same while proceeding in the analysis workflow.

12. The method of claim 8, wherein the result set comprises a sub-document, and the sub-document is tagged with a version identifier for a version of the result set for which the sub-document was created.

13. The method of claim 12, wherein the first copy of the result set includes a first sub-document and a subsequent copy of the result set includes a second sub-document, and wherein the instructions further configure the computer to compare the first sub-document to the second sub-document to identify a difference between the first copy of the result set and the subsequent copy of the result set.

14. The method of claim 8, wherein the analysis workflow is associated with an embedded method, and wherein the instructions further configure the computer to persist the embedded method with the persistent archived copy of the result set.

15. The method of claim 8, wherein the trigger comprises switch to a manual integration setting, changing a calibration parameter for the chromatography experiment, or changing a method setting.

16. The method of claim 8, wherein the indication is provided in a visually distinguished or spatially distinguished manner if the interaction matches a trigger condition.

17. The method of claim 16, wherein the visually distinguished or spatially distinguished manner provides an indication of the sequence that the plurality of stages of the analysis workflow were performed or the number of times that the stages of the analysis workflow were performed.

18. A computing apparatus comprising:
a processor; and
a memory storing instructions that, when executed by the processor, configure the apparatus to:
access a first copy of a result set comprising data for a chromatography experiment and configured to be processed according to an analysis workflow comprising a plurality of stages;
receive an instruction to engage in an interaction with the analysis workflow;
identify that the interaction matches a trigger condition;
make a second copy of the result set in response to the interaction matching the trigger condition;
make one of the first copy or the second copy of the result set a persistent archived copy; and
proceed in the analysis workflow with the other of the first copy or the second copy of the result set.

19. The computing apparatus of claim 18, wherein the trigger condition comprises one or more of:
move backwards or forwards in the workflow across a step boundary between the stages;
move backwards or forwards in the workflow across a gated step boundary between the stages;
move across a step boundary between the stages that an administrator has defined as requiring a version to be generated;
move backwards in the analysis workflow and making a change that would alter results previously generated; or
receive an instruction to clear the result set.

20. The computing apparatus of claim 19, wherein the persistent archived copy is the second copy of the result set, the first copy of the result set is used when proceeding in the analysis workflow, and an instance identifier of the first copy of the result set remains the same while proceeding in the analysis workflow.

21. The computing apparatus of claim 18, wherein the result set comprises a sub-document, and the sub-document is tagged with a version identifier for a version of the result set for which the sub-document was created, wherein the first copy of the result set includes a first sub-document and a subsequent copy of the result set includes a second sub-document, and wherein the instructions further configure the apparatus to compare the first sub-document to the second sub-document to identify a difference between the first copy of the result set and the subsequent copy of the result set.

22. The computing apparatus of claim 18, wherein the analysis workflow is associated with an embedded method, and wherein the instructions further configure the apparatus to persist the embedded method with the persistent archived copy of the result set.

* * * * *